United States Patent [19]

Tuttle, deceased et al.

[11] 3,784,306

[45] Jan. 8, 1974

[54] SIMULTANEOUS MULTIPLE STROBOSCOPIC INTERROGATION OF MEMORY

[76] Inventors: Fordyce E. Tuttle, deceased, late of Palm Beach, Fla.; by Eleanor Porter Tuttle, executrix, P.O. Box 908, Palm Beach, Fla.

[22] Filed: Sept. 27, 1971

[21] Appl. No.: 184,171

Related U.S. Application Data

[63] Continuation of Ser. No. 861,509, Sept. 26, 1969, abandoned.

[52] U.S. Cl. .................................... 356/23, 356/25

[51] Int. Cl. ............................................. G01p 3/40

[58] Field of Search ............. 356/23–26; 350/DIG. 1

[56] References Cited

UNITED STATES PATENTS

| | | | |
|---|---|---|---|
| 2,633,297 | 3/1953 | Quinby et al. | 356/23 X |
| 2,671,375 | 3/1954 | Boucher | 356/23 |
| 2,739,304 | 3/1956 | John | 356/23 X |

*Primary Examiner*—John K. Corbin
*Assistant Examiner*—F. L. Evans

[57] ABSTRACT

A method and apparatus for stroboscopic by interrogating information on a recording to quickly discern generally undistinguishable information. The recording has a high density of information packed therein. The recording is interrogated by a stroboscopic device that moves relative to the recording and that simultaneously strobes for a plurality of frequencies.

2 Claims, 2 Drawing Figures

INVENTOR.
FORDYCE E. TUTTLE
BY

INVENTOR.
FORDYCE E. TUTTLE
BY

SIMULTANEOUS MULTIPLE STROBOSCOPIC INTERROGATION OF MEMORY

This is a continuation of application Ser. No. 861,509, filed Sept. 26, 1969, abandoned.

BACKGROUND OF THE INVENTION

This invention relates to a new and improved apparatus and method of interrogation of information by simultaneous multiple stroboscopic interrogation of a recording of information to discern certain cyclic information.

In the past during electronic data processing, data is clipped, quantized and binary encoded for ease of computation. Early discarding of amplitude information is to be avoided to avoid loss of important information. Electron-optic devices and classical optic systems in combination with photographic recording material lend themselves nicely to the problems inherent in the steps in data processing, recording, storing, retrieving and displaying information. Optical pulse image methods have proven most useful in studies of high-speed motion. The present invention, disclosed herein provides means for interrogation of information without digital computation, therefore, the amplitude of information need not be sacrificed.

BRIEF DESCRIPTION OF THE INVENTION

The present invention relates to a new and improved interrogation apparatus and method for stroboscopic interrogation of a recording to quickly discern generally undistinguishable cyclic information, and, more particularly, to a apparatus and method of optically packing information on a record, providing relative movement between the stroboscopic device and the record, simultaneously strobing the packed information on the record for a plurality of frequencies, and viewing said stroboscopic interrogation as well as the original packed information for information retrieval purposes without loss of recorded information. The information is packed on a photographic or luminous record by a recording means. The input signal is converted by any well known means into a modulated light for high density recording of information on the moving record. A strobe tape having three parallel rows of optical slits for stroboscopic interrogation of varying frequencies is moved transversely across the moving record. An optical system is provided in order that each row of optical slits scan the same length or the same information recorded on the moving record. A photographic film strip is located adjacent the strobe tape and moved with the strobe tape to record the cyclic pulse images viewed through the strobe tape.

It is an object of this invention to provide a new and improved simultaneous multiple stroboscopic interrogation of recorded information.

Another object of this invention is to provide a noncomplex method and apparatus to interrogate a moving photographic recording of packed information for cyclic information that is not readily discernable.

A further object of this invention is to provide a stroe tape including a plurality of rows of optical slits for transversely strobing identical lengths of a relatively moving photographic record to quickly discern generally undistinguishable information.

In accordance with these and other objects which will be apparent hereinafter, the instant invention will now be described with particular reference to the accompanying drawing.

DESCRIPTION OF THE PREFERRED EMBODIMENTS

Figure 1:
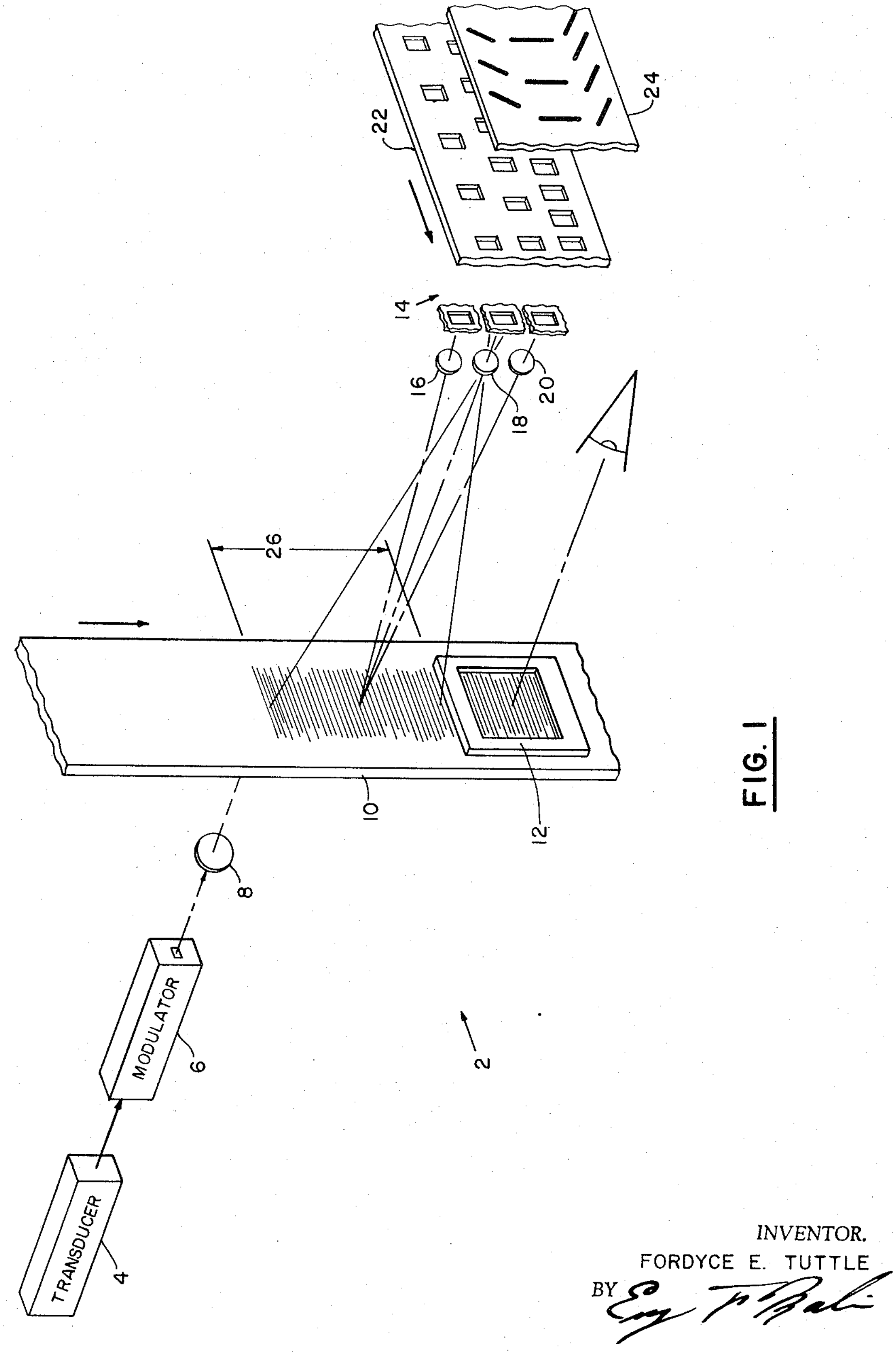
FIG. 1 is a perspective view of one embodiment of the invention.

Referring now to FIG. 1, illustrating an embodiment of the invention, the simultaneous multiple stroboscopic interrogation apparatus, generally designated as numeral 2, includes a transducer 4, for reciving signals and converting said received signals into corresponding electrical signals, a light modulator 6 connected to the transducer 4 for converting the electrical signals into modulated light having X-Y or Z type modulation, an optical means or lens 8 in the path of the modulated light from the light modulator 6, a memory device or record 10 for recording the modulated light information, observation window 12, and a camera system, generally designated by numeral 14 for simultaneous multiple stroboscopic interrogation of the information on record 10. The camera system includes objective lenses 16, 18, and 20 for observing the identical portion of the record 10, stroboscopic tape 22 with a plurality of rows of optical slits for simultaneous multiple stroboscopic interrogation of the information on the record 10, and a film 24 for recording the interrogated information. The film 24 may be replaced by a screen. The screen is also illustrated by numeral 24 in FIG. 1.

A received signal of an expected type is received by a suitable transducer 4 which converts the signal into a corresponding electric signal to be fed to any well-known device 6 for translating the electrical signal into modulated light having X-Y or Z type modulation. The modulated light is by known optical means, such as a lens 8 concentrated on a record or memory device 10 such as phosphor or a photographic film, much in the manner of an ordinary sound track recording. The record or memory device 10 is driven past the recording head by a drive means, not shown. The speed of the record 10 is such that the repetition rate of the expected signal is contained within a previously selected longitudinal section 26 of the record 10. This record 10 is continuously moving. The speed of the drive means is variable so that the speed of the record may be altered, if necessary, to include at least a complete cycle of the received signal as determined in any suitable manner such as by viewing the memory recording through an observation window 12. The dimensions of the observation window 12 along the longitudinal axis of the record 10 therefore bears a known relationship to the recording system. The signal, as recorded on the continuously moving record 10 is imaged, by one or more camera systems 14 including a stroboscopic tape 22 on a strip 24 of unexposed film or phosphor located in the focal plane of objective lenses 16, 18 and 20. The tape 22 contains, throughout its length, a series of equally spaced orthogonally arranged optical slits having a slit length at least equal to the image at the length of recorded memory formed by the lens 18. The tape 22 also contains, in the example shown, two other series of slits correspondingly arranged with respect to the lenses at 16 and 20. By means not shown, the tape 22 and the film 24 are transported in a direction transverse to the direction the record 10 moves during operation of the system. The speeds at which the tape 22 and film 24 are moved are not critical per se, and depend so greatly upon the result desired by the operator that they cannot readily be stated either numerically or by formula; however, it may be noted that inasmuch as the end object of this type of recording on the film 24 is to enable the eye of the operation to discern a signal which, except for the high density packing of the information, would be meaningless or at best of questionable value to the human eye the film 24 is moved quite slowly. Each of the three series of stroboscopic slits or gates is uniquely spaced to provide three different strobe rates, preferably with the middle series of slits having the intermediate strobe rate.

A system utilizing the general operating principles as described above is shown in FIG. 2. The incoming signals from a single transducer 28 or from two transducers 28 and 30 as determined by the position of a switch 32, energize the recording heads. Two optical recording heads 34 and 36 which simultaneously record side-by-side tracks on a phosphor surface 38 coated on the periphery of a drum 40 the width of which is at least sufficient to accommodate the two parallel tracks. The two recording heads 28 and 30 are angularly spaced from one another. The angular spacing may be arbitrary but the angular spacing is preferably approximately one and one-half times the angular width of the optical fiber window 42 to be described herebelow. By utilizing both of the transducers 28 and 30 in a selected or known spatial relation the recorded signals will contain available information of the azimuth angle of the signal source.

The observation window 44 corresponding in function to the window 12 in FIG. 1 is positioned in the direction of rotation of the drum 40 between the recording heads 34 and 36 and the optical fiber print-out windown 42. It is thus evident that rotation of the drum 40 in the clockwise direction shown will give an observer's eye 46 a view of the side-by-side recorded tracks before the tracks are erased by well-known means, not shown. The observation window 44 subtends at the center of the drum an angle similar to that subtended by the print-out window 42.

With the arrangement just described, the observer at position 46 can, by observation, recognize the presence of signals of similar characteristics but because of the speed at which the drum is turning and because of the time interval between the recording of the signals such signals may not be in transverse alignment. The speed for rotation of the drum 40 is varied by means of a control knob 48 so that the observer can regulate this speed of rotation to bring the desired alignment of the aforesaid signals.

Figure 2:
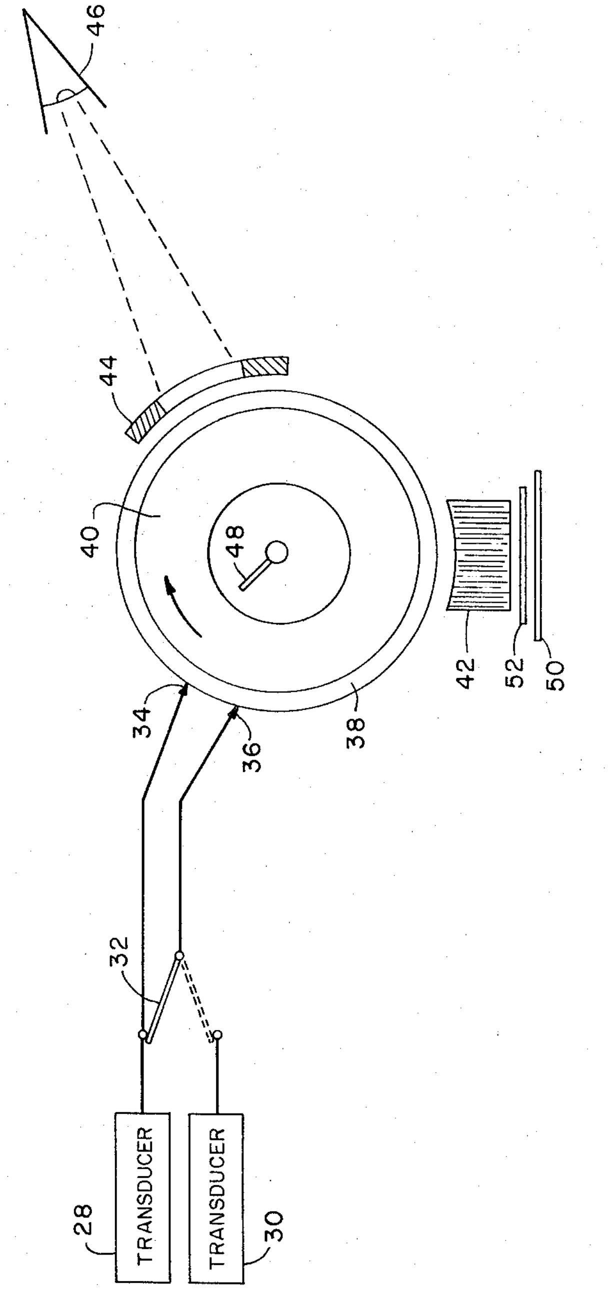
FIG. 2 is a side view of another embodiment of the invention.

The fiber optics print-out window 42 is constructed of fiber optics primarily to provide a flat image of the curved recording on the drum 40. The flat image is recorded on a film 50 in a manner functionally similar to that depicted in FIG. 1. The strobe tape 52 and tape 50 in FIG. 2 are moved in a direction normal to the drawing surface. It should be noted that it is highly preferable to limit the width dimension of the print-out window 42 to a length determined in the same fashion as set forth hereabove for the longitudinal length 26 in FIG. 1. The diameter of the drum is determined by the desired memory time.

I claim:

1. An interrogation apparatus for optically discerning particular, recorded information occurring cyclically from an information record comprising:

a moving record having a high density of information including cyclically occurring information optically packed thereon;

means for illuminating said infomation on said moving record;

a stroboscopic interrogating means optically communicating with said moving records for simultaneous multiple stroboscopic cyclic rate interrogation of said moving record to quickly discern certain cyclically occurring information, said stroboscopic interrogating means transversely strobing the moving information; and display means for displaying the strobed information.

2. An interrogation apparatus as set forth in claim 1, wherein said stroboscopic interrogating means includes:

a strobe tape having a plurality of rows of optical slits, each row having a different spacing between slits, said tape moving transversely to said moving record; and a plurality of optical lenses coupled between said tape and said record, each slit row having a corresponding lens for focusing illuminated record information into said display means.

* * * * *